US012803643B2

(12) United States Patent
Agiwal

(10) Patent No.: US 12,803,643 B2
(45) Date of Patent: Nov. 17, 2026

(54) SYSTEM AND METHOD OF PDCCH SKIPPING AND BEAM FAILURE RECOVERY

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 18/572,570

(22) PCT Filed: Jul. 21, 2022

(86) PCT No.: PCT/KR2022/010674
§ 371 (c)(1),
(2) Date: Dec. 20, 2023

(87) PCT Pub. No.: WO2023/003375
PCT Pub. Date: Jan. 26, 2023

(65) Prior Publication Data

US 2024/0292243 A1 Aug. 29, 2024

(30) Foreign Application Priority Data

Jul. 21, 2021 (KR) ........................ 10-2021-0095570

(51) Int. Cl.

| | |
|---|---|
| ***H04W 24/04*** | (2009.01) |
| ***H04B 7/06*** | (2006.01) |
| ***H04W 72/232*** | (2023.01) |
| ***H04W 76/28*** | (2018.01) |

(52) U.S. Cl.
CPC ........ *H04B 7/06964* (2023.05); *H04W 24/04* (2013.01); *H04W 72/232* (2023.01); *H04W 76/28* (2018.02)

(58) Field of Classification Search
CPC ................. H04W 24/04; H04W 76/28; H04W 72/232; H04B 7/06964; H04L 5/0053; H04L 1/1822
See application file for complete search history.

(56) References Cited

U.S. PATENT DOCUMENTS

| | | | | |
|---|---|---|---|---|
| 10,624,077 | B2 | 4/2020 | Agiwal et al. | |
| 12,200,511 | B2 * | 1/2025 | Yamada ............ | H04W 52/0216 |
| 2019/0253308 | A1 | 8/2019 | Huang et al. | |

(Continued)

OTHER PUBLICATIONS

Moderator (VIVO); FL summary of potential extension(s) to Rel-16 DCI-based power saving adaptation during DRX ActiveTime; 3GPP TSG RAN WG1 Meeting #102-e; R1-2007065; e-Meeting; Aug. 17-28, 2020; Aug. 20, 2020.

(Continued)

*Primary Examiner* — Rasheed Gidado
(74) *Attorney, Agent, or Firm* — Jefferson IP Law, LLP

(57) ABSTRACT

A method performed by a user equipment (UE) in a wireless communication system is provided. The method includes receiving downlink control information (DCI) including information that indicates skipping physical downlink control channel (PDCCH) monitoring for a first duration; detecting a beam failure; triggering a beam failure recovery; and monitoring a PDCCH associated with the beam failure recovery during a second duration within the first duration.

13 Claims, 14 Drawing Sheets

(56) References Cited

U.S. PATENT DOCUMENTS

| | | | | |
|---|---|---|---|---|
| 2020/0396684 | A1* | 12/2020 | Lin | H04W 52/0229 |
| 2021/0084507 | A1* | 3/2021 | Takeda | H04B 7/0695 |
| 2022/0369231 | A1* | 11/2022 | Ma | H04W 52/0229 |
| 2023/0048959 | A1* | 2/2023 | Hu | H04L 1/1883 |
| 2023/0134762 | A1* | 5/2023 | Koskela | H04W 24/08 370/329 |
| 2024/0023130 | A1* | 1/2024 | Schober | H04W 52/028 |

OTHER PUBLICATIONS

Huawei et al.; Extension(s) to Rel-16 DCI-based power saving adaptation for an active BWP; 3GPP TSG RAN WG1 Meeting #102-e; R1-2005264; E-meeting; Aug. 17-28, 2020; Aug. 8, 2020.

Qualcomm Incorporated; Potential extension(s) to Rel-16 DCI-based power saving adaptation during DRX Active Time; 3GPP TSG-RAN WG1 #102-e; R1-2006817; e-Meeting; Aug. 17-28, 2020; Aug. 8, 2020.

International Search Report with Written Opinion dated Oct. 21, 2022; International Appln. No. PCT/KR2022/010674.

* cited by examiner (A)

(B)

SYSTEM AND METHOD OF PDCCH SKIPPING AND BEAM FAILURE RECOVERY

TECHNICAL FIELD

The disclosure relates to a wireless communication system. Specifically, the disclosure relates to an apparatus, a method and a system for PDCCH monitoring.

BACKGROUND ART

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Bandwidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultrahigh-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The disclosure relates to operations of a user equipment (UE) and a base station (BS) in a wireless communication system. More particularly, the disclosure relates to method of physical downlink control channel (PDCCH) monitoring.

An aspect of the disclosure is to provide a method and apparatus for monitoring PDCCH(s) associated with beam failure recovery in case that PDCCH skipping duration is configured.

Another aspect of the disclosure is to provide a method and an apparatus for monitoring PDCCH(s) associated with beam failure recovery in case that PDCCH skipping duration is configured and at least one discontinuous reception (DRX) group is configured.

Additional aspects will be set forth in part in the description which follows and, in part, will be apparent from the description, or may be learned by practice of the presented embodiments.

Solution to Problem

In accordance with an aspect of the disclosure, a method performed by a user equipment (UE) in a wireless communication system is provided. The method includes receiving downlink control information (DCI) including information that indicates skipping physical downlink control channel (PDCCH) monitoring for a first duration; detecting a beam failure; triggering a beam failure recovery; and monitoring a PDCCH associated with the beam failure recovery during a second duration within the first duration.

In accordance with another aspect of the disclosure, a method performed by a base station in a wireless communication system is provided. The method includes transmitting, to a user equipment (UE), downlink control information (DCI) including information that indicates skipping physical downlink control channel (PDCCH) monitoring for a first duration; identifying that a beam failure recovery is triggered; and transmitting a PDCCH associated with the beam failure recovery during a second duration within the first duration.

In accordance with another aspect of the disclosure, a user equipment (UE) in a wireless communication system is provided. The UE includes a transceiver configured to receive downlink control information (DCI) including information that indicates skipping physical downlink control channel (PDCCH) monitoring for a first duration, and a controller coupled with the transceiver. The controller is configured to detect a beam failure, trigger a beam failure recovery, and monitor a PDCCH associated with the beam failure recovery during a second duration within the first duration.

In accordance with another aspect of the disclosure, a base station in a wireless communication system is provided. The base station includes a transceiver configured to transmit, to a user equipment (UE), downlink control information (DCI) including information that indicates skipping physical downlink control channel (PDCCH) monitoring for a first duration, and a controller coupled with the transceiver. The controller is configured to identify that a beam failure recovery is triggered, and control the transceiver to transmit a PDCCH associated with the beam failure recovery during a second duration within the first duration.

Other aspects, advantages, and salient features of the disclosure will become apparent to those skilled in the art from the following detailed description, which, taken in conjunction with the annexed drawings, discloses various embodiments of the disclosure.

Advantageous Effects of Invention

According to an embodiment of the disclosure, PDCCH associated with beam failure recovery can be received/transmitted within a duration in which skipping of the PDCCH monitoring is indicated.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1:
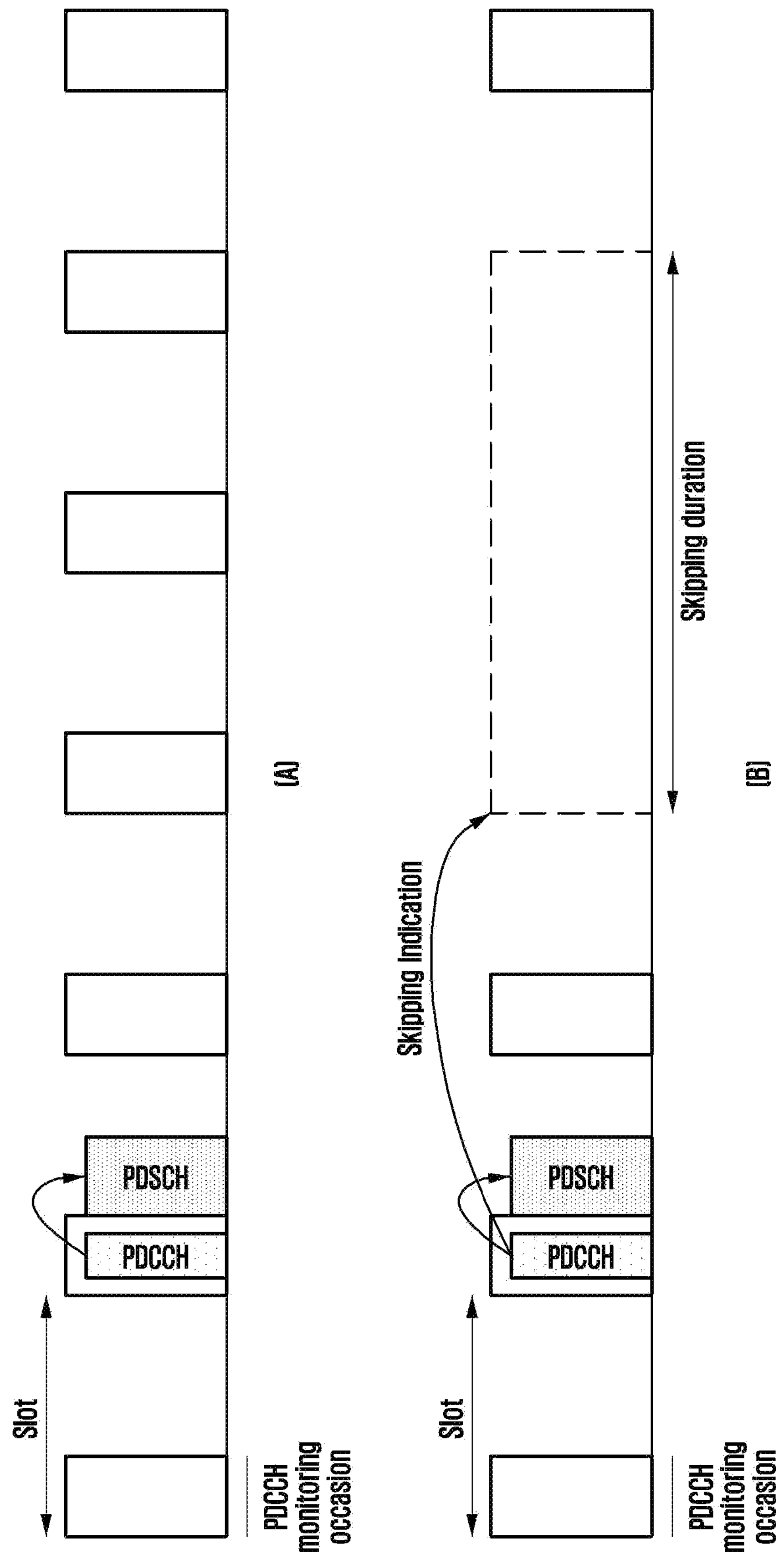
FIG. 1 illustrates an example of normal PDCCH monitoring and an example of PDCCH monitoring skipping.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the detailed description below, it can be advantageous to set forth definitions of certain words and phrases used herein. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", and "one embodiment" or "embodiment" means that particular elements, features, structures or characteristics described in connection with the embodiment is included in at least one embodiment. The phrases "in one embodiment" or "in one example" appearing in different places do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having meanings apparent to those of ordinary skill in the art. However, these terms may have different meanings according to the intention of those of ordinary skill in the art, precedents or the emergence of new technologies, and therefore, the terms used herein must be defined based on the meanings of these terms together with the description provided herein.

Hereinafter, for example, the base station may be at least one of a gNode B, an eNode B (eNB), a Node B, a radio access unit, a base station controller, and a node on a network. The terminal may include a user equipment (UEL), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station.

The various embodiments discussed below for describing the principles of the disclosure herein are for illustration purposes only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to 5G, those skilled in the art can understand that the main points of the disclosure can also be applied to other communication systems (for example, beyond 5G (B5G) or 6G) with similar technical backgrounds and channel formats with slight modifications without departing from the scope of the disclosure.

Hereinafter, the embodiments of the disclosure will be described in detail with reference to the accompanying drawings. It should be noted that the same reference numerals in different drawings will be used to refer to the same elements already described.

Carrier aggregation (CA)/Multi-connectivity in fifth generation wireless communication system: The fifth generation wireless communication system supports standalone mode of operation as well dual connectivity (DC). In DC a multiple reception (Rx)/transmission (Tx) UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-radio access technology (RAT) Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access, contention free random access and each of these can be one 2 step or 4 step random access.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous reception (DRX) may be configured by upper layers. The UE monitors Short Messages transmitted with paging RNTI (P-RNTI) over DCI; monitors a Paging channel for CN paging using 5G-S-temporary mobile subscriber identity (5G-S-TMSI); performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

PDCCH in fifth generation wireless communication system: In the fifth generation wireless communication system, Physical Downlink Control Channel (PDCCH) is used to schedule DL transmissions on physical downlink shared channel (PDSCH) and UL transmissions on physical uplink shared channel (PUSCH), where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency-division multiplexing (OFDM) symbol(s) where the UE may assume no transmission is intended for the UE; Transmission of transmit power control (TPC) commands for PUCCH and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by gNB for each configured BWP of serving cell wherein each search configuration is uniquely identified by a search space identifier. Search space identifier is unique amongst the BWPs of a serving cell. Identifier of search space configuration to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y^*(\text{number of slots in a radio frame})+x-\text{Monitoring-offset-PDCCH-slot})\bmod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by gNB for each configured BWP of serving cell wherein each coreset configuration is uniquely identified by an coreset identifier. Coreset identifier is unique amongst the BWPs of a serving cell.

Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR.

Each coreset configuration is associated with a list of Transmission configuration indicator (TCI) states. One DL reference signal (RS) ID (e.g., Synchronization Signal Block (SSB) or channel state information reference signal (CSI RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi co located (QCLed) with SSB/CSI RS of TCI state) used by gNB for transmission of PDCCH in the PDCCH monitoring occasions of a search space.

In 5G wireless communication system, the PDCCH monitoring activity of the UE in RRC connected mode is governed by DRX. When DRX is configured, the UE does not have to continuously monitor PDCCH. DRX is characterized by the following:

- on-duration: duration that the UE waits for, after waking up, to receive PDCCHs. If the UE successfully decodes a PDCCH, the UE stays awake and starts the inactivity timer;
- inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);
- retransmission-timer: duration until a retransmission can be expected;
- cycle: specifies the periodic repetition of the on-duration followed by a possible period of inactivity (see FIG. 5 below);
- active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In fifth generation wireless communication system, in the RRC_CONNECTED serving cells of a MAC entity may be configured by RRC in two DRX groups with separate DRX parameters. Note that MAC entity is per cell group (CG). When RRC does not configure a secondary DRX group in a CG, there is only one DRX group in that CG and all Serving Cells of that belong to that one DRX group. When two DRX groups are configured in a CG, each Serving Cell of CG is uniquely assigned to either of the two groups. DRX Parameters are categorised into group specific parameters and common parameters. The group specific parameters consist of drx-onDurationTimer and drx-InactivityTimer. The common parameters consist of drx-SlotOffset, drx-RetransmissionTimerDL, drx-RetransmissionTimerUL, drx-LongCycleStartOffset, drx-ShortCycle (optional), drx- ShortCycleTimer (optional), drx-HARQ-RTT-TimerDL, and drx-HARQ-RTT-TimerUL.

The fifth generation wireless communication system supports beam failure detection and recovery mechanism at UE for serving cell. This comprises of beam failure detection, new candidate beam identification, beam failure recovery request transmission and monitoring response for beam failure recovery request. For beam failure detection of a serving cell, UE is configured with a list of beam failure detection RSs (SSB or CSI-RS based) for that serving cell. UE monitors these RSs periodically. A beam failure is detected on a serving cell if number of consecutive detected beam failure instance exceeds a configured maximum number (beamFailureInstanceMaxCount) within a configured time (beamFailureDetectionTimer). A Beam Failure Instance means that hypothetical PDCCH BLER determined based on measurement of beam failure detection RS is above a threshold for all beam failure detection RSs. Beam failure detection may be configured for zero or one or more serving cells. Upon beam failure instance, lower layer i.e. PHY sends indication to MAC. The MAC entity in UE for each Serving Cell configured for beam failure detection, perform the following operation:

- 1> if beam failure instance indication has been received from lower layers:
  - 2> start or restart the beamFailureDetectionTimer;
  - 2> increment BFI_COUNTER by 1;
  - 2> if BFI_COUNTER>=beamFailureInstanceMaxCount:
    - 3> if the Serving Cell is SCell:
      - 4> trigger a BFR for this Serving Cell;
    - 3> else:
      - 4> initiate a Random Access procedure on the SpCell.
- 1> if the beamFailureDetectionTimer expires; or
- 1> if beamFailureDetectionTimer, beamFailureInstanceMaxCount, or any of the reference signals used for beam failure detection is reconfigured by upper layers (i.e. RRC) associated with this Serving Cell:
  - 2> set BFI_COUNTER to 0.
- 1> if the Serving Cell is SpCell and the Random Access procedure initiated for SpCell beam failure recovery is successfully completed:
  - 2> set BFI_COUNTER to 0;
  - 2> stop the beamFailureRecoveryTimer, if configured;
  - 2> consider the Beam Failure Recovery procedure successfully completed.
- 1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
- 1> if the SCell is deactivated:
  - 2> set BFI_COUNTER to 0;
  - 2> consider the Beam Failure Recovery procedure successfully completed and cancel all the triggered BFRs for this Serving Cell.

The MAC entity shall:

- 1> if the Beam Failure Recovery procedure determines that at least one BFR has been triggered and not cancelled:
  - 2> if UL-SCH resources are available for a new transmission and if the UL-SCH resources can accommodate the BFR MAC CE plus its sub header as a result of LCP:
    - 3> instruct the Multiplexing and Assembly procedure to generate the BFR MAC CE.
  - 2> else if UL-SCH resources are available for a new transmission and if the UL-SCH resources can accommodate the Truncated BFR MAC CE plus its sub header as a result of LCP:
    - 3> instruct the Multiplexing and Assembly procedure to generate the Truncated BFR MAC CE.
  - 2> else:
    - 3> trigger the SR for SCell beam failure recovery for each SCell for which BFR has been triggered and not cancelled.

All BFRs triggered prior to MAC PDU assembly for beam failure recovery for an SCell shall be cancelled when a MAC PDU is transmitted and this PDU includes a BFR MAC CE or Truncated BFR MAC CE which contains beam failure information of that SCell.

beamFailureInstanceMaxCount, beamFailureDetectionTimer, beamFailureRecoveryTimer for the beam failure recovery procedure are specific to serving cell. BFI_COUNTER is maintained separately for each serving cell configured with beam failure detection.

Meanwhile, there have been various studies on optimising PDCCH monitoring in 5G communication system recently. FIG. 1 illustrates an example of normal PDCCH monitoring and an example of PDCCH monitoring skipping. FIG. 1(A) illustrates normal PDCCH monitoring where UE monitors all the configured PDCCH monitoring occasions. FIG. 1(B) illustrates PDCCH skipping indicated by scheduling DCI. Referring to FIG. 1(B), PDCCH skipping may be applied by UE for PDCCH monitoring in RRC_CONNECTED state. The scheduling DCI is the DCI which indicates scheduled DL or UL resources. Skipping duration may be indicated by RRC message or may be indicated by DCI or may be pre-defined. Upon receiving PDCCH skipping indication, UE skips PDCCH monitoring during the skipping duration.

SSSG (search space set group) switching for PDCCH skipping may also be applied by UE for PDCCH monitoring in RRC_CONNECTED state. UE may be switched to an 'empty' SSSG i.e. no SS set(s) is configured for this SSSG. So, UE does not monitoring PDCCH when UE switches to it.

The above information is presented as background information only to assist with an understanding of the disclosure. No determination has been made, and no assertion is made, as to whether any of the above might be applicable as prior art with regard to the disclosure.

Figure 2:
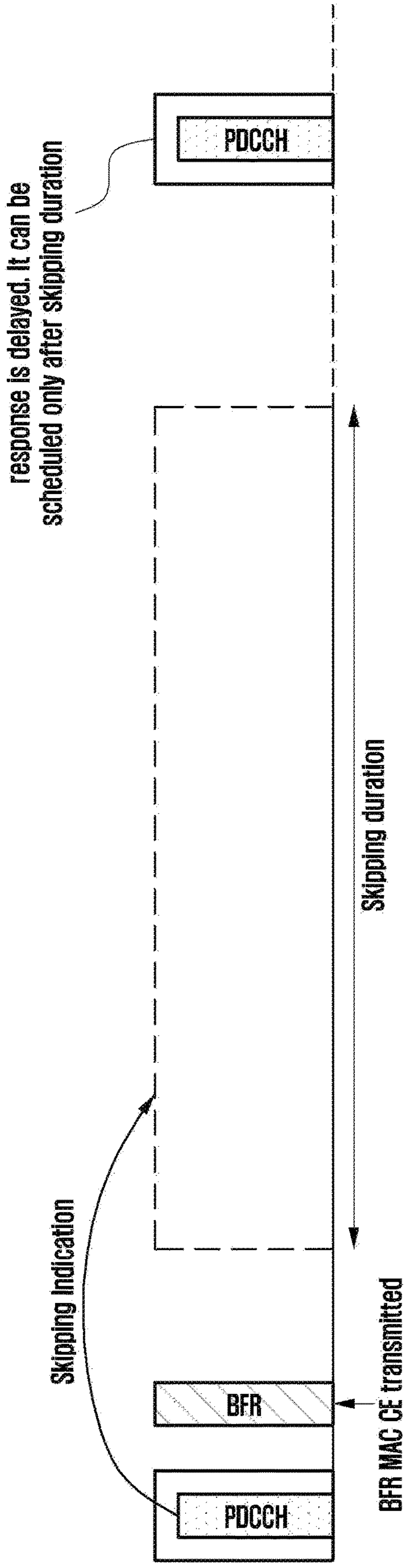
FIG. 2 illustrates an example in which BFR response is delayed due to a skipping duration.

FIG. 2 illustrates an example in which beam failure recovery (BFR) response is delayed due to a skipping duration.

Referring to FIG. 2, if the UE has received PDCCH skipping indication and BFR is triggered for a SCell and BFR MAC CE/truncated BFR MAC CE is transmitted including beam failure recovery information of the SCell, BFR response (i.e. PDCCH addressed to cell RNTI (C-RNTI) indicating uplink grant for a new transmission is received for the HARQ process used for the transmission of the BFR MAC CE or Truncated BFR MAC CE which contains beam failure recovery information of the SCell) from gNB is delayed due to skipping duration.

Hereinafter, when skipping of PDCCH monitoring is indicated and a procedure for a beam failure recovery is performed, methods for receiving a BFR response will be described.

Method 1

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH. The DCT in the PDCCH may include/indicate PDCCH skipping.

Beam failure may be detected and beam failure recovery may be triggered as explained earlier. In the description ‘BFR response is pending’ may also be referred as ‘BFR is triggered and not yet cancelled’. Triggered BFR may be cancelled when BFR response is received.

In this method of the disclosure, if (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information (e.g. candidate beam/SSB/CSIRS if available of failed SCell or serving cell or TRP of serving cell, candidate beam/SSB/CSIRS is available or not) of the SCell or serving cell or TRP of serving cell) from gNB is pending at the time when the PDCCH skipping indication is received; or if (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response from gNB is pending during the PDCCH skipping duration, UE may perform the following operation (e.g., option 1 or option 2); if (Enhanced) BFR MAC CE or truncated (Enhanced) BFR MAC CE is received and BFR response transmission is pending during the PDCCH skipping duration, gNB may perform the following operation (e.g., option 1 or option 2):

Option 1: PDCCH skipping may be cancelled or suspended or ignored by UE and gNB may cancel or suspend or ignore PDCCH skipping for the UE, on all serving cells of the CG during the PDCCH skipping duration while the BFR response is pending. In other words, PDCCH skipping may be cancelled or suspended or ignored on all serving cells of the CG in the portion/part of PDCCH skipping duration which overlaps with time BFR response is pending. The portion/part of PDCCH skipping duration may be entire PDCCH skipping duration as well. Here CG may refer to cell group of serving cell/SCell for which UE has sent the (Enhanced) BFR MAC CE or truncated (Enhanced) BFR MAC CE to gNB for BFR. CG may be MCG or SCG.

Option 2: Amongst all serving cells of CG, PDCCH skipping may be cancelled or suspended or ignored by UE and gNB may cancel or suspend or ignore PDCCH skipping for the UE, on a specific serving cell(s) during the PDCCH skipping duration while the BFR response is pending. Here CG may refer to cell group of serving cell/SCell for which UE has sent the (Enhanced) BFR MAC CE or truncated (Enhanced) BFR MAC CE to gNB for BFR. CG may be MCG or SCG.

For example, specific serving cell may be a serving cell not indicated as failed in (Enhanced) BFR MAC CE or Truncated (Enhanced) BFR MAC CE.

Alternatively, specific serving cell may be the serving cell on which UE has transmitted (Enhanced) BFR MAC CE or Truncated (Enhanced) BFR MAC CE.

Alternatively, specific serving cell may be the SpCell or any other serving cell indicated by gNB in RRC signaling or serving cell(s) which is/are indicated as failed in Enhanced) BFR MAC CE or Truncated (Enhanced) BFR MAC CE.

Figure 3:
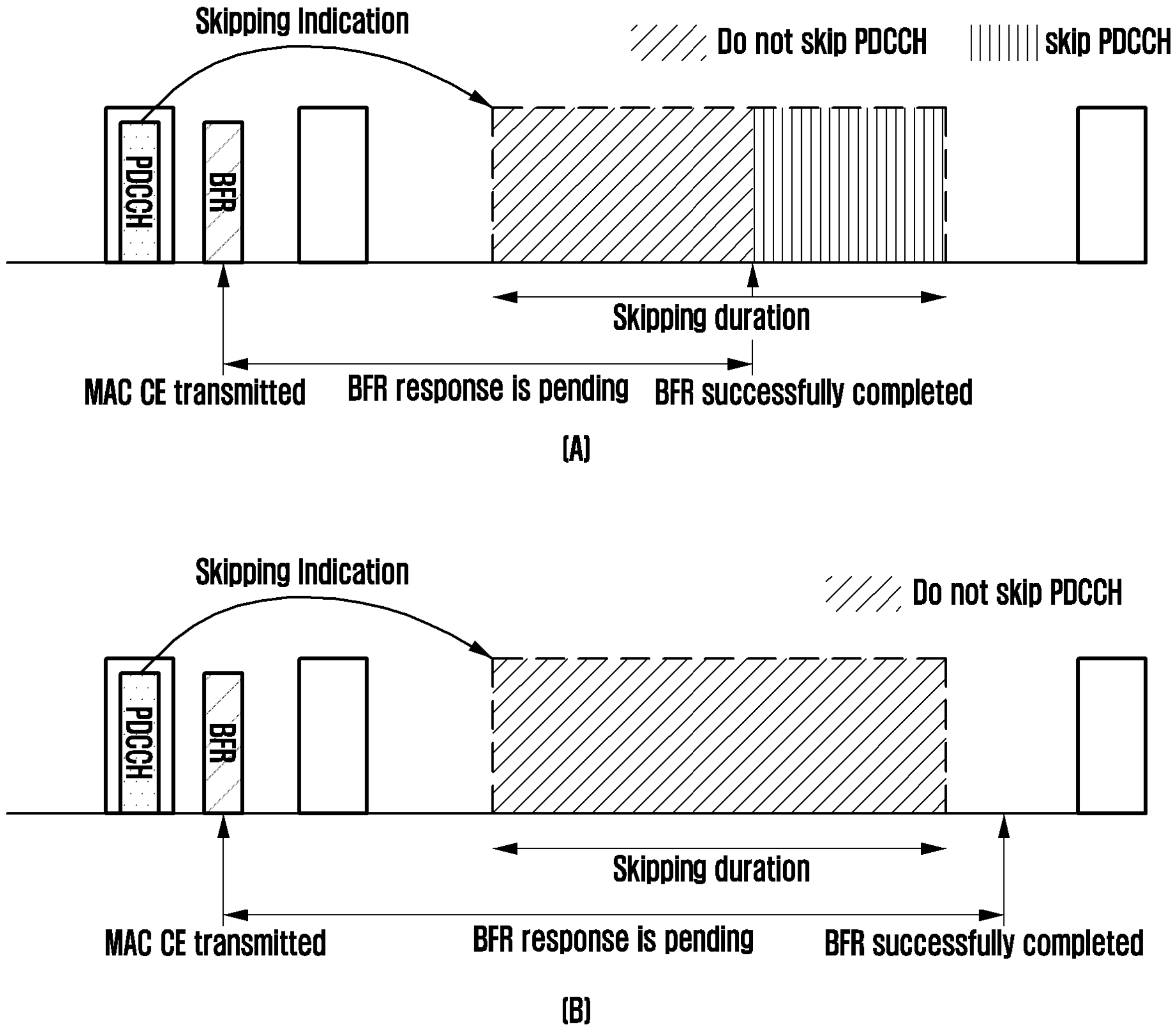
FIG. 3 illustrates an example of PDCCH monitoring for a duration where a duration in which the BFR response is pending and the PDCCH skipping duration overlapped, according to an embodiment of the disclosure.

FIG. 3 illustrates an example of PDCCH monitoring for a duration where a duration in which the BFR response is pending and the PDCCH skipping duration overlapped, according to an embodiment of the disclosure.

Referring to FIG. 3(A), in case that the BFR response is received before end of the PDCCH skipping duration, UE may skip the PDCCH monitoring from after the BFR response is received. Referring to FIG. 3(B), if the duration in which the BFR response is pending ends later than the PDCCH skipping duration in time domain, UE may not skip the PDCCH monitoring for the PDCCH skipping duration.

In an embodiment, in the above description, PDCCH indicating UE to switch to an empty SSSG (i.e. SSSG not configured with any search space sets) or default SSSG is also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE. For example, UE may receive the PDCCH skipping indication during the small data transmission (SDT) procedure in RRC_INACTIVE and BFR may be triggered for the camped cell and BFR MAC CE may be transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by GNB after the successful completion of random access procedure.

Method 2

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH wherein the DCI in the PDCCH may include/indicate PDCCH skipping.

Beam failure may be detected and beam failure recovery may be triggered as explained earlier. In the description ‘BFR response is pending’ may also be referred as ‘BFR is triggered and not yet cancelled’. Triggered BFR may be cancelled when BFR response is received.

In this method of the disclosure, if (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell or serving cell or TRP of serving cell) from gNB is pending at the time when the PDCCH skipping indication is received; or if (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response from gNB is pending during the PDCCH skipping duration, UE may perform the following operation (e.g., option 1 or option 2); if (Enhanced) BFR MAC CE or truncated (Enhanced) BFR MAC CE is received and BFR response transmission is pending during the PDCCH skipping duration, gNB may perform the following operation (e.g., option 1 or option 2):

Option 1: PDCCH skipping may be cancelled or suspended or ignored and gNB may cancel or suspend or ignore PDCCH skipping for the UE, on all serving cells of the CG during the PDCCH skipping duration. In other words, PDCCH skipping may be cancelled or suspended or ignored on all serving cells of the CG in the PDCCH skipping duration.

Option 2: Amongst all serving cells of CG, PDCCH skipping may be cancelled or suspended or ignored by UE and gNB may cancel or suspend or ignore PDCCH skipping for the UE, on a specific serving cell(s) during the PDCCH skipping duration. In other words, PDCCH skipping may be cancelled or suspended or ignored on a specific serving cell(s) in the PDCCH skipping duration.

For example, specific serving cell may be a serving cell not indicated as failed in (Enhanced) BFR MAC CE or Truncated (Enhanced) BFR MAC CE.

Alternatively, specific serving cell may be the serving cell on which UE has transmitted (Enhanced) BFR MAC CE or Truncated (Enhanced) BFR MAC CE.

Alternatively, specific serving cell may be the SpCell or any other serving cell indicated by gNB in RRC signaling or serving cell(s) which is/are indicated as failed in Enhanced) BFR MAC CE or Truncated (Enhanced) BFR MAC CE.

Figure 4:
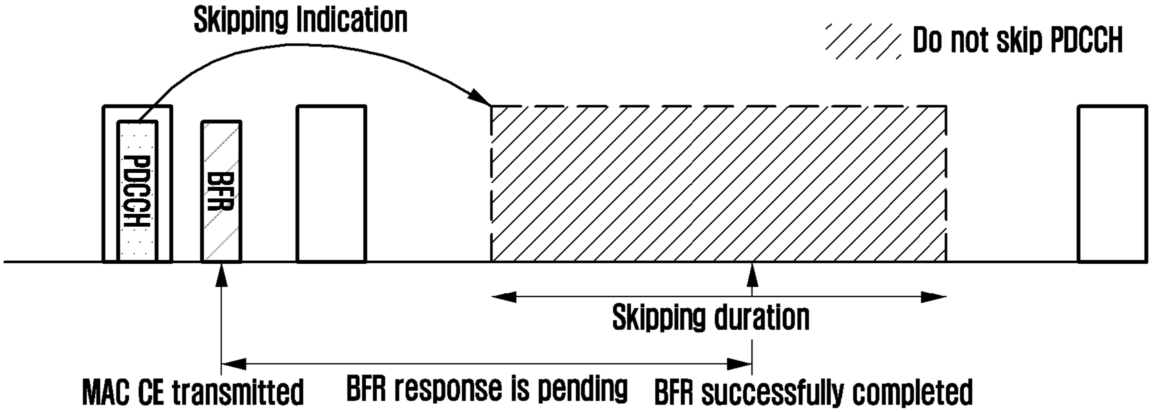
FIG. 4 illustrates an example of PDCCH monitoring in the PDCCH skipping duration, according to an embodiment of the disclosure.
Figure 4:
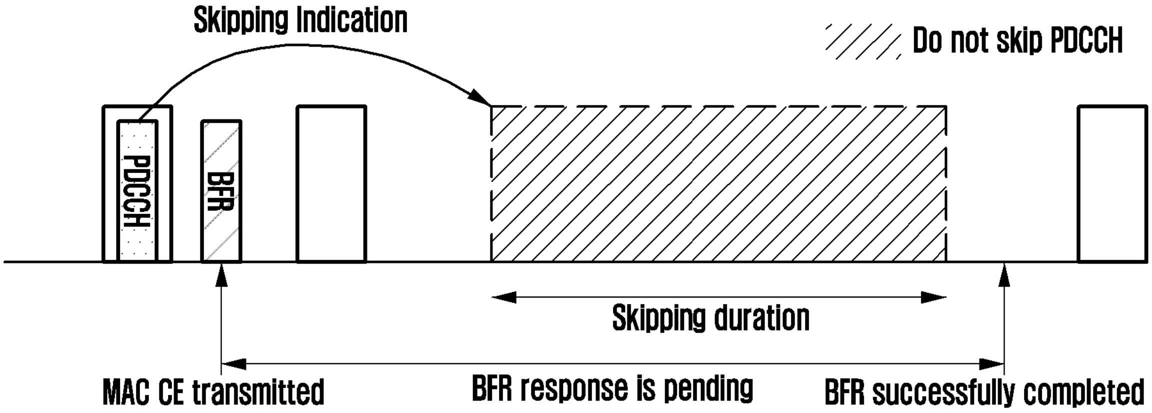

FIG. 4 illustrates an example of PDCCH monitoring in the PDCCH skipping duration, according to an embodiment of the disclosure.

Referring to FIG. 4(A), the BFR response is received before end of the PDCCH skipping duration and BFR is successfully completed. UE does not skip the PDCCH monitoring for the PDCCH skipping duration (i.e. UE monitors PDCCH for the PDCCH skipping duration). Referring to FIG. 4(B), if the duration in which the BFR response is pending ends later than the PDCCH skipping duration in time domain, UE does not skip the PDCCH monitoring for the PDCCH skipping duration.

In an embodiment, in the above description, PDCCH indicating UE to switch to an empty SSSG (i.e. SSSG not configured with any search space sets) or default SSSG is also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE. For example, UE may receive the PDCCH skipping indication during the small data transmission procedure in RRC_INACTIVE and BFR may be triggered for camped cell and BFR MAC CE may be transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 3

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH wherein the DCI in the PDCCH includes/indicates PDCCH skipping.

Beam failure may be detected and beam failure recovery may be triggered as explained earlier. In the description 'BFR response is pending' may also be referred as 'BFR is triggered and not yet cancelled'. Triggered BFR may be cancelled when BFR response is received.

In this method of the disclosure PDCCH skipping indication may be for a DRX group. If PDCCH skipping indication is received from a serving cell for a DRX group, PDCCH skipping may be applied during the PDCCH skipping duration for all serving cells (SpCell and active secondary serving cells) of that DRX group:

Case 1) If PDCCH skipping duration for a DRX group does not occur while (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell or serving cell or TRP of serving cell) from gNB is pending, UE may continue PDCCH skipping for the other DRX group.

Figure 5:
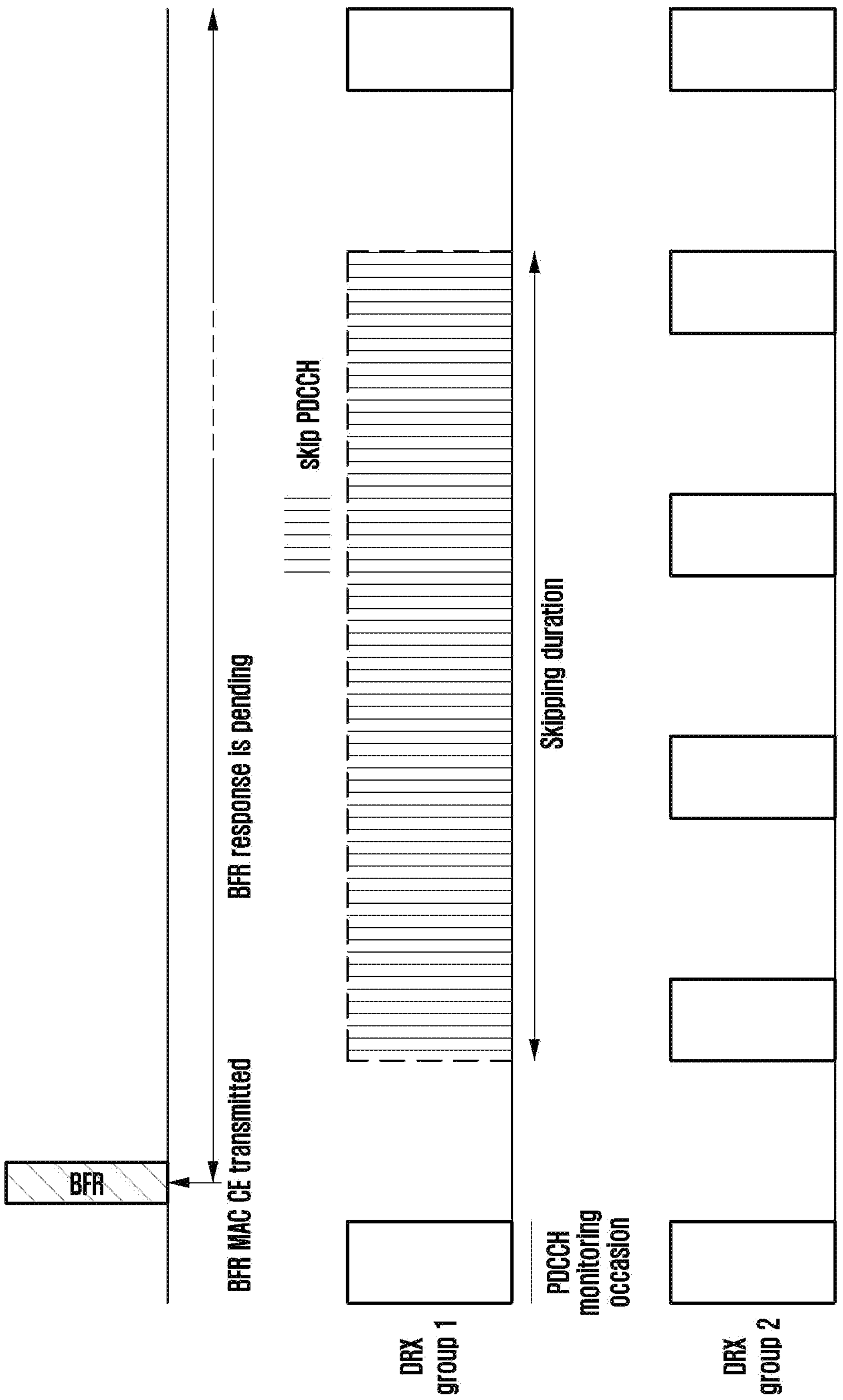
FIG. 5 illustrates an example in which PDCCH skipping duration is configured for one DRX group, according to an embodiment of the disclosure.

FIG. 5 illustrates an example in which PDCCH skipping duration is configured for one DRX group, according to an embodiment of the disclosure.

Referring to FIG. 5, BFR response is pending during the skipping duration for DRX group 1. As there is no skipping indicated for the DRX group 2 while the BFR response is pending, UE may not cancel or suspend or ignore PDCCH skipping in DRX group 1. If PDCCH skipping duration for a DRX group does not occur while (Enhanced) BFR MAC CE or truncated (Enhanced) BFR MAC CE is received and BFR response transmission is pending, gNB may continue PDCCH skipping for the other DRX group.

Case 2) If PDCCH skipping duration for both DRX groups occurs while (Enhanced) BFR MAC CE or Truncated (Enhanced) BFR MAC CE is transmitted for indicating failed SCell (or serving cell or TRP of serving cell) and beam failure recovery information (i.e. candidate beam/

SSB/CSI RS if available of failed Scell or Serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell or Serving cell or TRP of serving cell) from gNB is pending, during the time duration of skipping which is common between both DRX groups while BFR response is pending, UE and gNB may cancel or suspend or ignore PDCCH skipping in one or more serving cells using one of the options listed below (e.g., option 1 to option 6).

Figure 6:
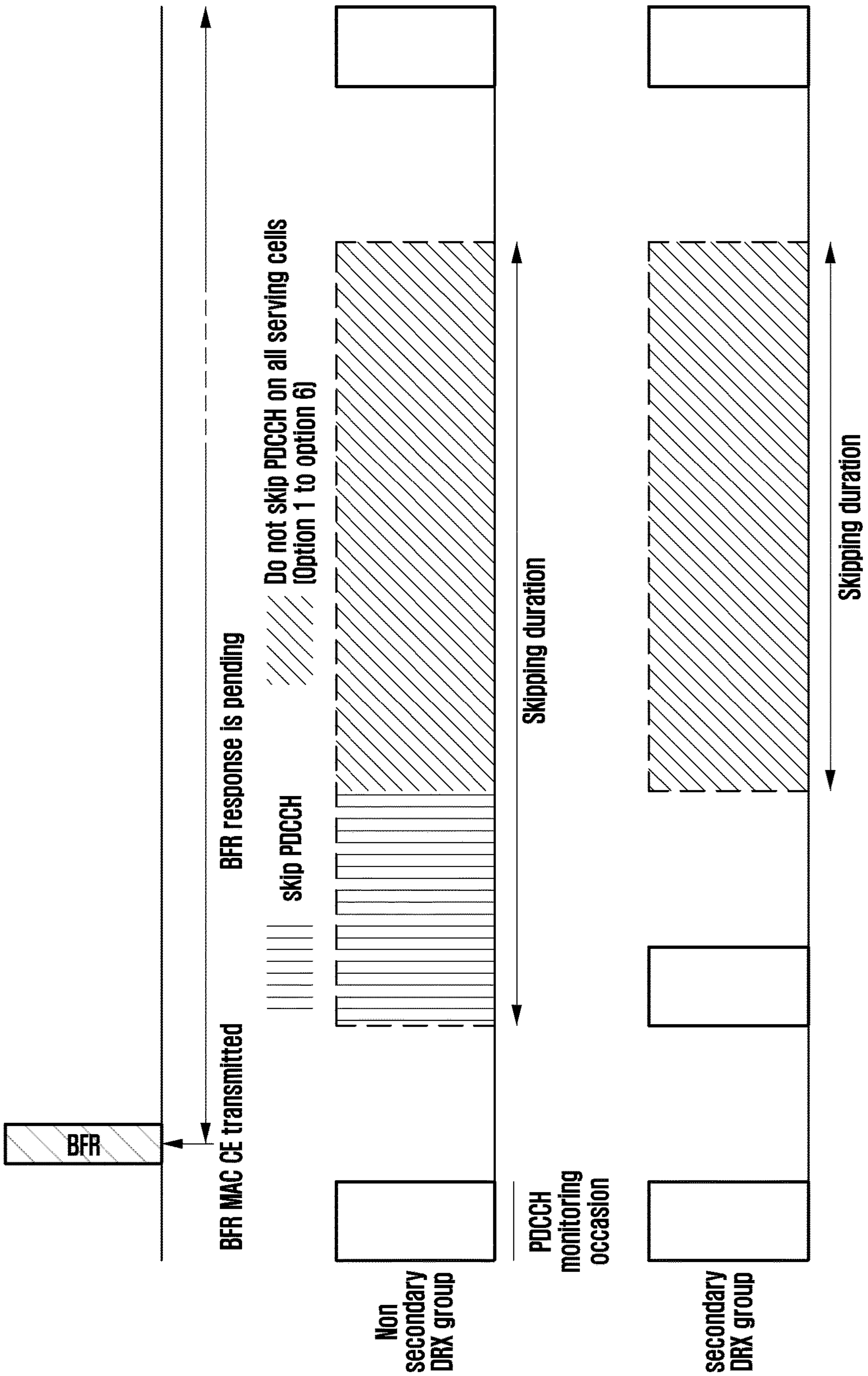
FIG. 6 illustrates an example in which PDCCH skipping duration is configured for each of both DRX groups, according to an embodiment of the disclosure.

FIG. 6 illustrates an example in which PDCCH skipping duration is configured for each of both DRX groups, according to an embodiment of the disclosure.

Referring to FIG. 6, BFR response is pending during the skipping duration in DRX group 1 (e.g., non-secondary DRX group) and DRX group 2 (e.g., secondary DRX group). During the time duration of skipping which is common between both DRX groups while BFR response is pending, UE may cancel PDCCH skipping in one or more serving cells as per option 1 to option 6 described below (e.g., option 1 to option 6).

Figure 7:
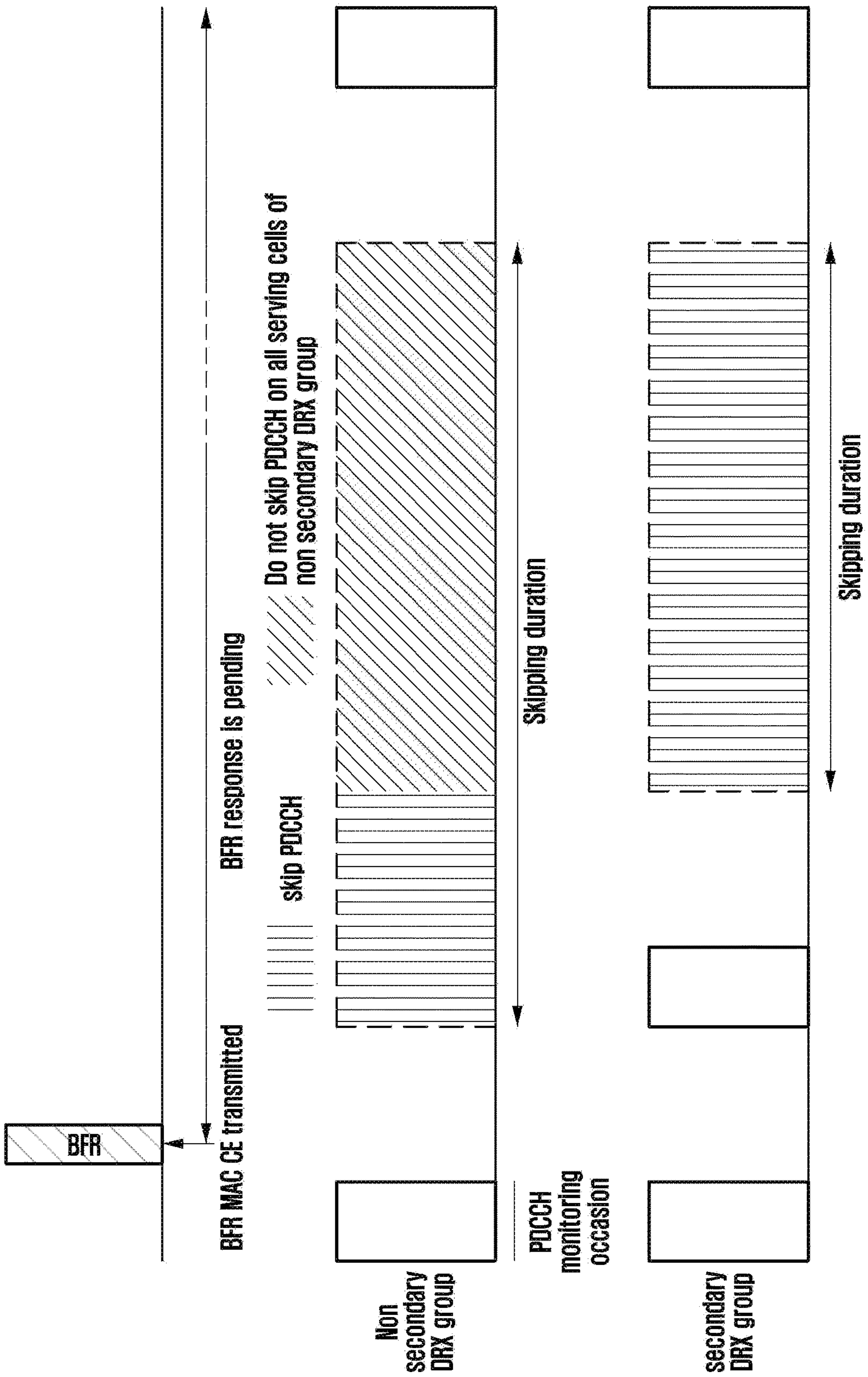
FIG. 7 illustrates an example of skipping PDCCH monitoring when PDCCH skipping duration is configured for each of both DRX groups, according to an embodiment of the disclosure.

Option 1: UE may cancel or suspend or ignore PDCCH skipping and gNB may cancel or suspend or ignore PDCCH skipping for the UE, on all serving cells of the non-secondary DRX group of CG during the PDCCH skipping duration (while the BFR response is pending). This is illustrated in FIG. 7. Here CG may refer to cell group of serving cell/SCell for which UE has sent the (Enhanced) BFR MAC CE or truncated (Enhanced) BFR MAC CE to gNB for BFR. CG may be MCG or SCG.

FIG. 7 illustrates an example of skipping PDCCH monitoring when PDCCH skipping duration is configured for each of both DRX groups, according to an embodiment of the disclosure.

Referring to FIG. 7, BFR response is pending during the skipping duration in DRX group 1 (e.g., non secondary DRX group) and DRX group 2 (e.g., secondary DRX group). For the time duration where skipping duration is common between both DRX groups while BFR response is pending, UE and gNB may cancel or suspend or ignore PDCCH skipping in serving cells of non-secondary DRX group as per this option. For the time duration where skipping duration is common between both DRX groups while BFR response is pending, UE and gNB may skip or cancel or ignore PDCCH monitoring in serving cells of secondary DRX group as per this option.

Figure 8:
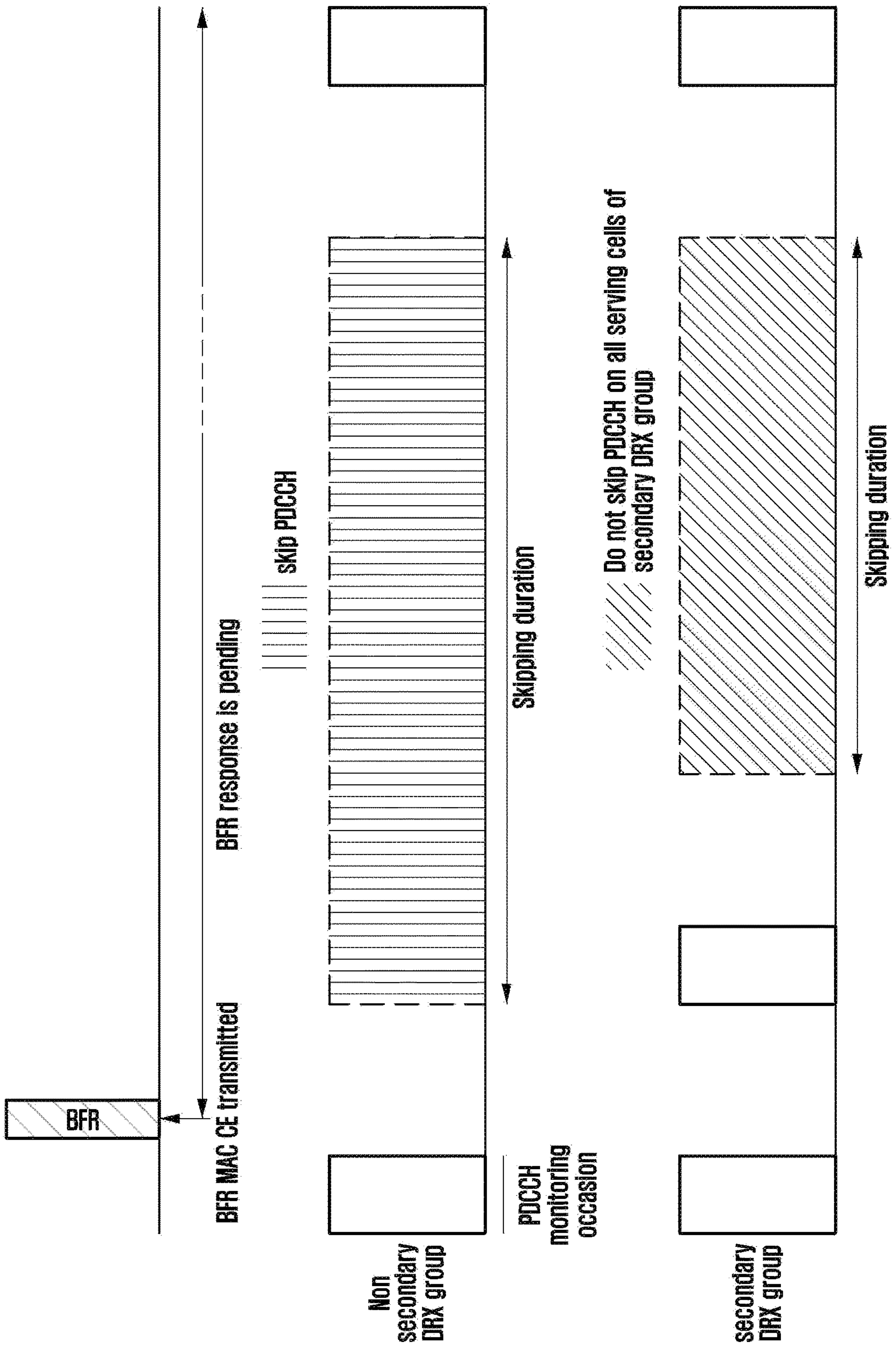
FIG. 8 illustrates another example of skipping PDCCH monitoring when PDCCH skipping duration is configured for each of both DRX groups, according to an embodiment of the disclosure.

Option 2: UE may cancel or suspend or ignore PDCCH skipping and gNB may cancel or suspend or ignore skipping for the UE, on all serving cells of the secondary DRX group of CG during the PDCCH skipping duration (while the BFR response is pending). This is illustrated in FIG. 8. Here CG may refer to cell group of serving cell/SCell for which UE has sent the (Enhanced) BFR MAC CE or truncated (Enhanced) BFR MAC CE to gNB for BFR. CG may be MCG or SCG.

FIG. 8 illustrates another example of skipping PDCCH monitoring when PDCCH skipping duration is configured for each of both DRX groups, according to an embodiment of the disclosure.

Referring to FIG. 8, BFR response is pending during the skipping duration in DRX group 1 (e.g., non secondary DRX group) and DRX group 2 (e.g., secondary DRX group). For the time duration where skipping duration is common between both DRX groups while BFR response is pending, UE and gNB may cancel or suspend or ignore PDCCH skipping in serving cells of secondary DRX group as per this option. For the time duration where skipping duration is common between both DRX groups while BFR response is pending, UE and gNB may skip or cancel or ignore PDCCH monitoring in serving cells of non secondary DRX group as per this option.

Option 3: UE may cancel or suspend or ignore PDCCH skipping and gNB may cancel or suspend or ignore PDCCH skipping for the UE, on all serving cells of the DRX group of serving cell on which UE has transmitted (Enhanced) BFR MAC CE or truncated (Enhanced) BFR MAC CE, during the PDCCH skipping duration while the BFR response is pending. This is illustrated in FIG. 9.

Figure 9:
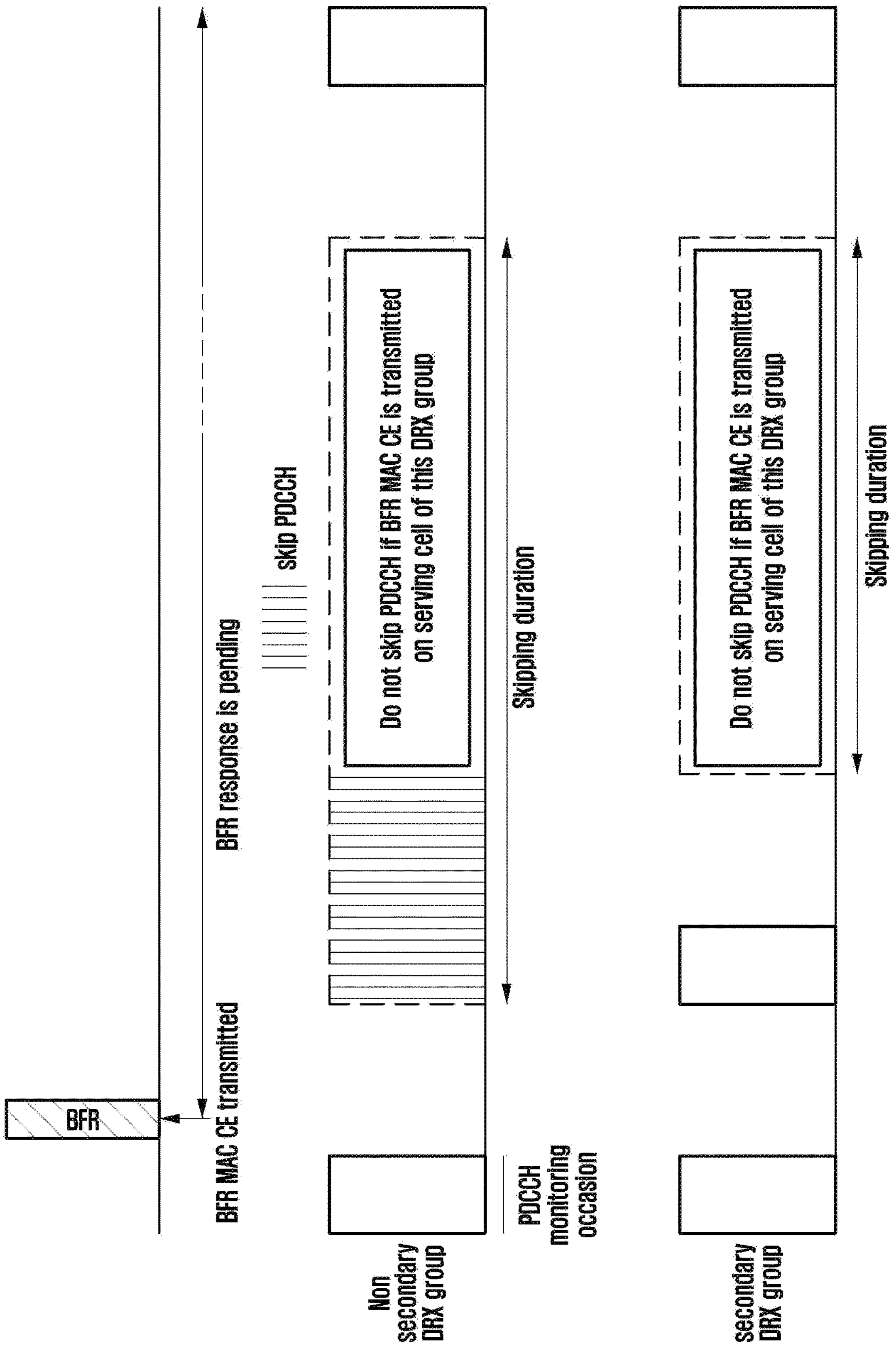
FIG. 9 illustrates another example of skipping PDCCH monitoring when PDCCH skipping duration is configured for each of both DRX groups, according to an embodiment of the disclosure.

FIG. 9 illustrates another example of skipping PDCCH monitoring when PDCCH skipping duration is configured for each of both DRX groups, according to an embodiment of the disclosure.

Referring to FIG. 9, BFR response is pending during the skipping duration in DRX group 1 (e.g., non secondary DRX group) and DRX group 2 (e.g., secondary DRX group). For the time duration where skipping duration is common between both DRX groups while BFR response is pending, UE and gNB may cancel or suspend or ignore PDCCH skipping in serving cells of either secondary DRX group or non-secondary DRX group depending on where the BFR MAC CE is transmitted as per option 3.

Option 4: UE may cancel or suspend or ignore PDCCH skipping and gNB may cancel or suspend or ignore PDCCH skipping for the UE, on all serving cells of the DRX group indicated by gNB, during the PDCCH skipping duration (while the BFR response is pending).

Option 5: option 1 of method 1.

Option 6: option 2 of method 1.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the time duration until UE receives PDCCH indicating UE to switch to a non-empty SSSG or non-default SSSG.

In an embodiment, the above operation can also be applied in RRC_INACTIVE and/or RRC_IDLE. For example, UE may receive the PDCCH skipping indication during the small data transmission procedure in RRC_INACTIVE and BFR may be triggered for the camped cell and transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 4

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH wherein the DCI in the PDCCH includes/indicates PDCCH skipping.

Beam failure may be detected and beam failure recovery may be triggered as explained earlier. In the description 'BFR response is pending' may also be referred as 'BFR is triggered and not yet cancelled'. Triggered BFR may be cancelled when BFR response is received.

In this method of the disclosure PDCCH skipping indication may be for a DRX group. If PDCCH skipping indication is received from a serving cell for a DRX group, PDCCH skipping may be applied during the PDCCH skipping duration for all serving cells (SpCell and active secondary serving cells) of that DRX group:

Case 1) If PDCCH skipping duration for a DRX group does not occur while (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed Scell or Serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell) from gNB is pending, UE may continue PDCCH skipping for the other DRX group.

Figure 10:
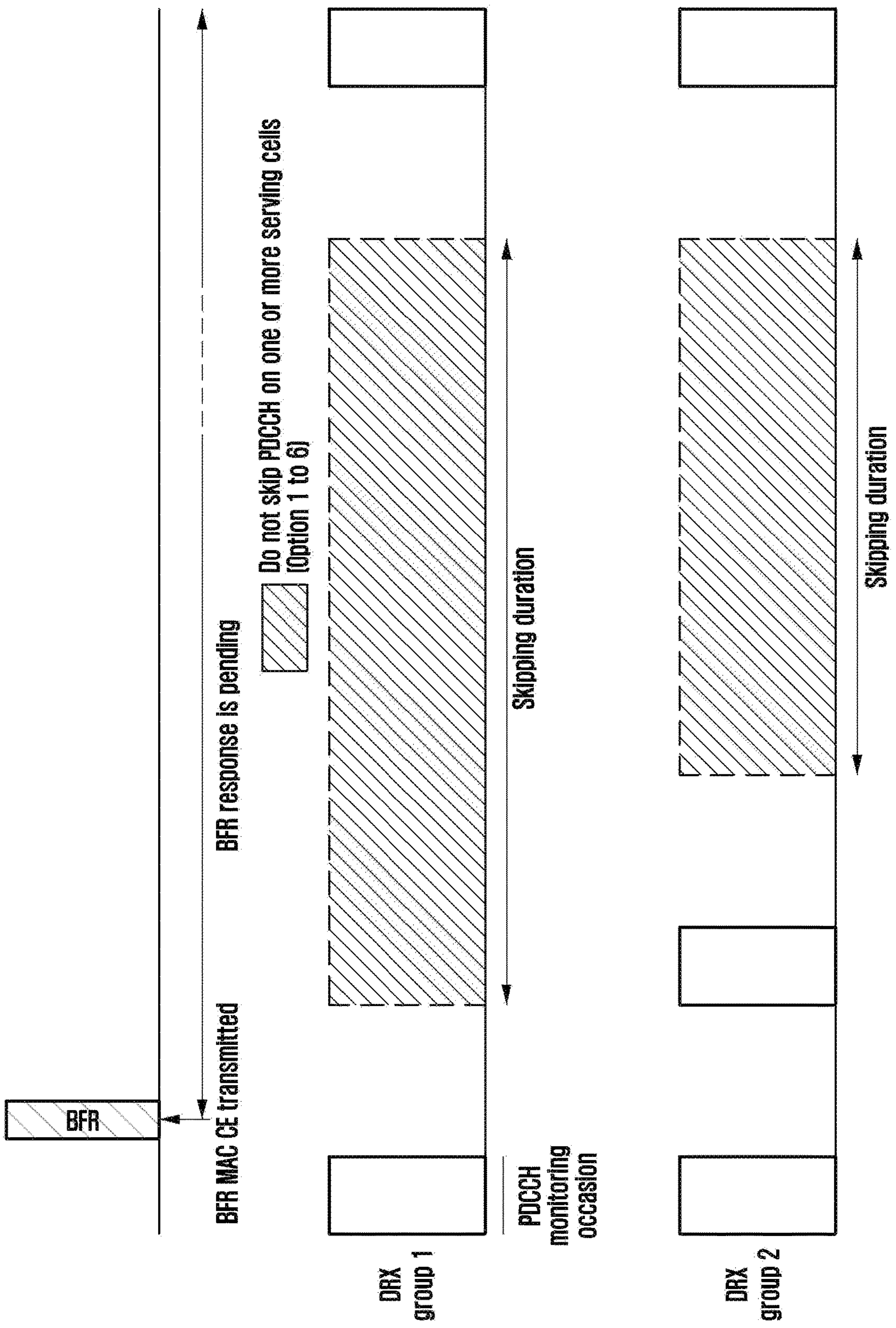
FIG. 10 illustrates an example in which PDCCH skipping duration is configured for each of both DRX groups, according to an embodiment of the disclosure.

Case 2) FIG. 10 illustrates an example in which PDCCH skipping duration is configured for each of both DRX groups, according to an embodiment of the disclosure. Referring to FIG. 10, BFR response is pending during the skipping duration in DRX group 1 and DRX group 2. If PDCCH skipping duration for both DRX groups occurs while (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed Scell or Serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell) from gNB is pending, during the time duration of skipping, UE and gNB may cancel or suspend or ignore PDCCH skipping in one or more serving cells using one of the options listed below (e.g., option 1 to option 6).

Option 1: UE may cancel or suspend or ignore PDCCH skipping and gNB may cancel or suspend or ignore PDCCH skipping for the UE, on all serving cells of the non-secondary DRX group of CG during the PDCCH skipping duration.

Option 2: UE may cancel or suspend or ignore PDCCH skipping and gNB may cancel or suspend or ignore PDCCH skipping for the UE, on all serving cells of the secondary DRX group of CG during the PDCCH skipping duration.

Option 3: UE may cancel or suspend or ignore PDCCH skipping and gNB may cancel or suspend or ignore PDCCH skipping for the UE, on all serving cells of the DRX group of serving cell on which UE has transmitted (Enhanced) BFR MAC CE or Truncated (Enhanced) BFR MAC CE, during the PDCCH skipping duration.

Option 4: UE may cancel or suspend or ignore PDCCH skipping and gNB may cancel or suspend or ignore PDCCH skipping for the UE, on all serving cells of the DRX group indicated by gNB, during the PDCCH skipping duration Option 5: option 1 of method 2

Option 6: option 2 of method 2

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE. For example, UE may receive the PDCCH skipping indication during the small data transmission procedure in RRC_INACTIVE and BFR may be triggered for the camped cell and transmitted in RRC_INACTIVE state. The PDCCH skipping indication may be indicated in wakeup signal or early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 5

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH wherein the DCI in the PDCCH includes/indicates PDCCH skipping.

Beam failure may be detected and beam failure recovery may be triggered as explained earlier. In the description 'BFR response is pending' may also be referred as 'BFR is triggered and not yet cancelled'. Triggered BFR may be cancelled when BFR response is received.

Figure 11:
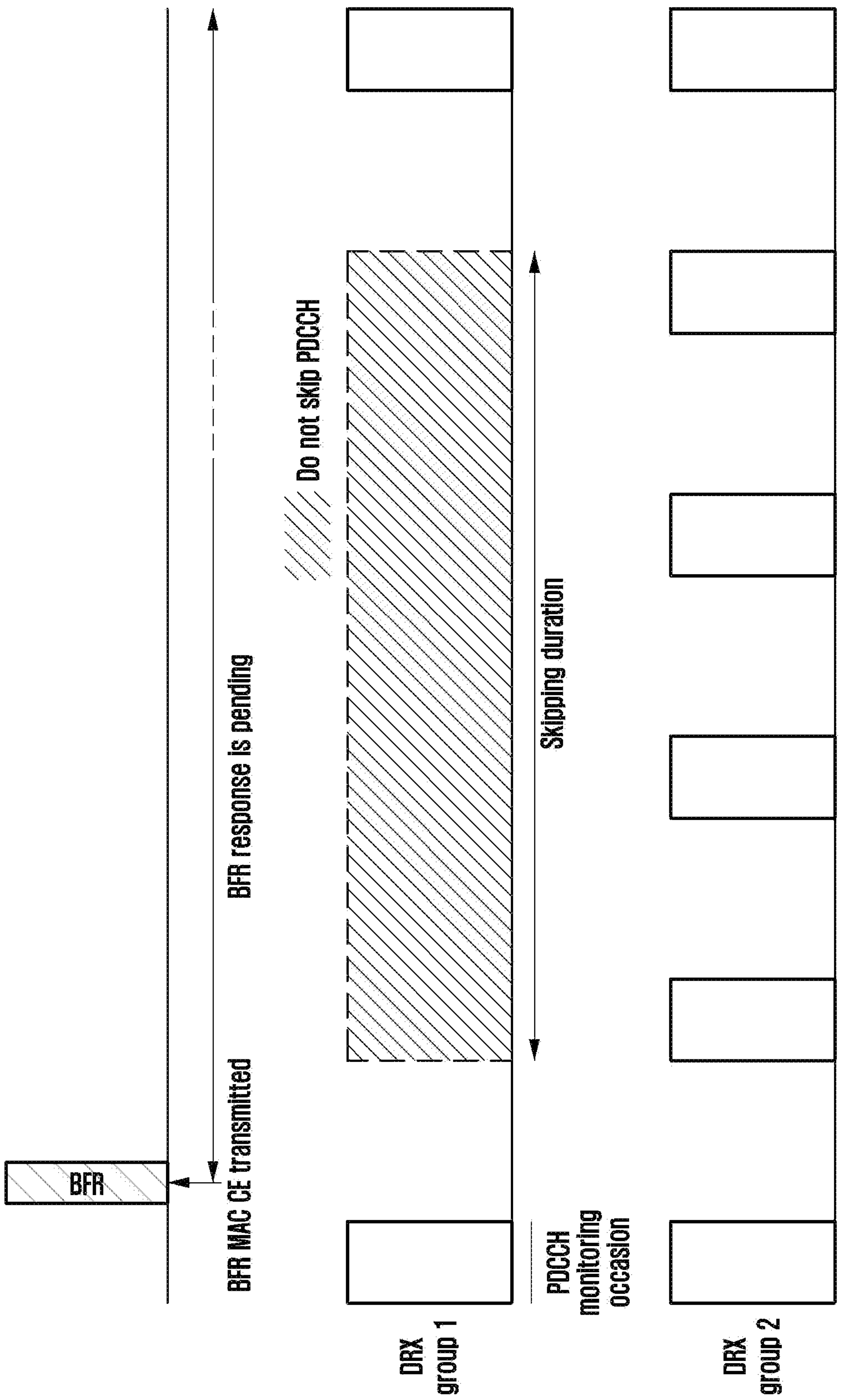
FIG. 11 illustrates an example in which PDCCH skipping duration is configured for a DRX group, according to an embodiment of the disclosure.

In this method of the disclosure PDCCH skipping indication may be for a DRX group, if PDCCH skipping indication is received from a serving cell for a DRX group, PDCCH skipping may be applied during the PDCCH skipping duration for all serving cells (SpCell and active secondary serving cells) of that DRX group:

if PDCCH skipping duration for a DRX group occurs while (Enhanced) BFR MAC CE or Truncated BFR MAC CE is transmitted for indicating failed SCell (or serving cell or TRP of serving cell) and beam failure recovery information (i.e. candidate beam/SSB/CSI RS if available SCell or serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell or serving cell or TRP of serving cell) from gNB is pending, UE and gNB may cancel or suspend or ignore PDCCH skipping for that DRX group. FIG. 11 illustrates an example in which PDCCH skipping duration is configured for a DRX group, according to an embodiment of the disclosure. Referring to FIG. 11, in case that PDCCH skipping duration for the DRX group 1 occurs while (Enhanced) BFR MAC CE or Truncated (Enhanced) BFR MAC CE is transmitted and BFR response is pending, UE may cancel or suspend or ignore PDCCH skipping for DRX group 1.

(Alternate) if PDCCH skipping duration for a DRX group occurs while BFR response is pending, UE and gNB may cancel or suspend or ignore PDCCH skipping for that DRX group in the portion of PDCCH skipping duration which overlaps with pending BFR response duration.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE. For example, UE may receive the PDCCH skipping indication during the small data transmission procedure in RRC_INACTIVE and BFR may be triggered for the camped cell and transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 6

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH. The DCI in the PDCCH includes/indicates PDCCH skipping.

Beam failure may be detected and beam failure recovery may be triggered as explained earlier. In the description ‘BFR response is pending’ may also be referred as ‘BFR is triggered and not yet cancelled’. Triggered BFR may be cancelled when BFR response is received.

If there is at least one serving cell for which PDCCH skipping duration does not occur while (Enhanced) BFR MAC CE or Truncated (Enhanced) BFR MAC CE is transmitted for indicating failed SCell (or serving cell or TRP of serving cell) and beam failure recovery information (i.e. candidate beam/SSB/CSI RS if available of failed SCell or serving cell or TRP of serving cell), and BFR response (i.e. PDCCH addressed to C-RNTI indicating uplink grant for a new transmission is received for the HARQ process used for the transmission of the (Enhanced) BFR MAC CE or Truncated (Enhanced) BFR MAC CE which contains beam failure recovery information of the SCell) from GNB is pending, UE may continue PDCCH skipping for the serving cell(s) for which PDCCH skipping indication(s) are received. Otherwise, UE and gNB may cancel or suspend or ignore PDCCH skipping for one or more serving cell(s) while BFR response is pending using one of the options described below (e.g., option 1 to option 6):

Option 1: UE may cancel or suspend or ignore PDCCH skipping and gNB may cancel or suspend or ignore PDCCH skipping for the UE, on all serving cells of the non-secondary DRX group during the PDCCH skipping duration. Alternately, UE may cancel or suspend or ignore PDCCH skipping and gNB may cancel or suspend or ignore PDCCH skipping for the UE, on all serving cells of the non-secondary DRX group during the PDCCH skipping duration while the BFR response is pending i.e. PDCCH skipping may be cancelled or skipped or ignored on all serving cells of the of the non-secondary DRX group of the CG in the portion of PDCCH skipping duration which overlaps with pending BFR response duration. Here CG may refer to cell group of serving cell/SCell for which UE has sent the (Enhanced) BFR MAC CE or truncated (Enhanced) BFR MAC CE to gNB for BFR. CG may be MCG or SCG.

Option 2: UE may cancel or suspend or ignore PDCCH skipping and gNB may cancel or suspend or ignore PDCCH skipping for the UE, on all serving cells of the secondary DRX group during the PDCCH skipping duration. Alternately, UE may cancel or suspend or ignore PDCCH skipping and gNB may cancel or suspend or ignore PDCCH skipping for the UE, on all serving cells of the secondary DRX group during the PDCCH skipping duration while the BFR response is pending i.e. PDCCH skipping may be cancelled or skipped or ignored on all serving cells of the of the secondary DRX group of the CG in the portion of PDCCH skipping duration which overlaps with pending BFR response duration. The portion/part of PDCCH skipping duration may be entire PDCCH skipping duration as well. Here CG may refer to cell group of serving cell/SCell for which UE has sent the (Enhanced) BFR MAC CE or truncated (Enhanced) BFR MAC CE to gNB for BFR. CG may be MCG or SCG.

Option 3: UE may cancel or suspend or ignore PDCCH skipping and gNB may cancel or suspend or ignore PDCCH skipping for the UE, on all serving cells of the DRX group of serving cell on which UE has transmitted (Enhanced) BFR MAC CE or Truncated (Enhanced) BFR MAC CE, during the PDCCH skipping duration. Alternately, UE may cancel or suspend or ignore PDCCH skipping and gNB may cancel or suspend or ignore PDCCH skipping for the UE, on all serving cells of the DRX group of serving cell on which UE has transmitted (Enhanced) BFR MAC CE or truncated (Enhanced) BFR MAC CE, during the PDCCH skipping duration while the BFR response is pending i.e. PDCCH skipping may be cancelled or skipped or ignored on all serving cells of the of the DRX group of serving cell on which UE has transmitted SR in the portion of PDCCH skipping duration which overlaps with pending BFR response duration. The portion/part of PDCCH skipping duration may be entire PDCCH skipping duration as well. Here CG may refer to cell group of serving cell/SCell for which UE has sent the (Enhanced) BFR MAC CE or truncated (Enhanced) BFR MAC CE to gNB for BFR. CG may be MCG or SCG.

Option 4: UE may cancel or suspend or ignore PDCCH skipping and gNB may cancel or suspend or ignore PDCCH skipping for the UE, on all serving cells of the DRX group indicated by gNB, during the PDCCH skipping duration. Alternately, UE may cancel or suspend or ignore PDCCH skipping and gNB may cancel or suspend or ignore PDCCH skipping for the UE, on all serving cells of the DRX group indicated by gNB, during the PDCCH skipping duration while the BFR response is pending i.e. PDCCH skipping may be cancelled on all serving cells of the of the DRX group indicated by gNB, in the portion of PDCCH skipping duration which overlaps with pending BFR response duration. The portion/part of PDCCH skipping duration may be entire PDCCH skipping duration as well.

Option 5: UE may cancel or suspend or ignore PDCCH skipping and gNB may cancel or suspend or ignore PDCCH skipping for the UE, on all serving cells of the CG during the PDCCH skipping duration. Alternately, UE may cancel or suspend or ignore PDCCH skipping and gNB may cancel or suspend or ignore PDCCH skipping for the UE, on all serving cells of the CG, during the PDCCH skipping duration while the BFR response is pending i.e. PDCCH skipping may be cancelled or skipped or ignored on all serving cells of the CG, in the portion of PDCCH skipping duration which overlaps with pending BFR response duration. The portion/part of PDCCH skipping duration may be entire PDCCH skipping duration as well. Here CG may refer to cell group of serving cell/SCell for which UE has sent the (Enhanced) BFR MAC CE or truncated (Enhanced) BFR MAC CE to gNB for BFR. CG may be MCG or SCG.

Option 6: Amongst all serving cells of CG, UE may monitor PDCCH on specific serving cell(s) during the PDCCH skipping duration. Alternately, UE may cancel or suspend or ignore PDCCH skipping and gNB may cancel or suspend or ignore PDCCH skipping for the UE, on specific serving cell(s), during the PDCCH skipping duration while the BFR response is pending i.e. PDCCH skipping may be cancelled or skipped or ignored on specific serving cell(s), in the portion of PDCCH skipping duration which overlaps with pending BFR response duration.

For example, specific serving cell may be a serving cell not indicated as failed in (Enhanced) BFR MAC CE or truncated (Enhanced) BFR MAC CE.

Alternatively, specific serving cell may be the serving cell on which UE has transmitted (Enhanced) BFR MAC CE or truncated (Enhanced) BFR MAC CE.

Alternatively, specific serving cell may be the SpCell or any other serving cell indicated by gNB in RRC signaling or serving cell(s) which is/are indicated as failed in Enhanced) BFR MAC CE or Truncated (Enhanced) BFR MAC CE.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE. For example, UE may receive the PDCCH skipping indication during the small data transmission procedure in RRC_INACTIVE and BFR may be triggered on the camped cell and transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by GNB after the successful completion of random access procedure.

Method 7

UE may be in RRC_CONNECTED state.

UE may monitor PDCCH in the active DL BWP of SpCell and active DL BWP(s) of activated Secondary cell(s). The PDCCH may be monitored in PDCCH monitoring occasions configured by one or more search space configurations of active DL BWP.

UE may receive PDCCH wherein the DCI in the PDCCH includes/indicates PDCCH skipping.

In this method of the disclosure:

if PDCCH skipping duration for a serving cell occurs while (Enhanced) BFR MAC CE or Truncated BFR MAC CE is transmitted for indicating failed SCell (or serving cell or TRP of serving cell) and beam failure recovery information (i.e. candidate beam/SSB/CSI RS if available failed SCell or serving cell or TRP of serving cell), and BFR response (i.e. PDCCH addressed to C-RNTI indicating uplink grant for a new transmission is received for the HARQ process used for the transmission of the (Enhanced BFR MAC CE or Truncated (Enhanced BFR MAC CE which contains beam failure recovery information of the SCell or serving cell or TRP of serving cell) from gNB is pending, UE and gNB may cancel or suspend or ignore PDCCH skipping for that serving cell during the PDCCH skipping duration.

(Alternate) if PDCCH skipping duration for a serving cell occurs while (Enhanced BFR MAC CE or Truncated (Enhanced BFR MAC CE is transmitted for indicating failed SCell (or serving cell or TRP of serving cell) and beam failure recovery information (i.e. candidate beam/SSB/CSI RS if available failed SCell or serving cell or TRP of serving cell), and BFR response (i.e. PDCCH addressed to C-RNTI indicating uplink grant for a new transmission is received for the HARQ process used for the transmission of the (Enhanced BFR MAC CE or Truncated (Enhanced BFR MAC CE which contains beam failure recovery information of the SCell or serving cell or TRP of serving cell) from gNB is pending, UE and gNB may cancel or suspend or ignore PDCCH skipping for that serving cell in the portion of PDCCH skipping duration which overlaps with pending BFR response duration. The portion/part of PDCCH skipping duration may be entire PDCCH skipping duration as well.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the time duration until UE receives PDCCH indicating UE to switch to a non-empty SSSG or non-default SSSG.

In an embodiment, the above operation may also be applied in RRC_INACTIVE and/or RRC_IDLE, for example UE may receive the PDCCH skipping indication during the small data transmission procedure in RRC_INACTIVE and BFR may be triggered for the camped cell and transmitted in RRC_INACTIVE state. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

In methods 1 to 7 described in the disclosure, when UE may cancel or skip or ignore PDCCH skipping, it may cancel or skip or ignore PDCCH skipping for RNTI(s) (e.g. C-RNTI, MCS-RNTI) using which BFR response is transmitted.

In methods 1 to 7 described in this disclosure, in an embodiment, if criteria (as defined in methods 1 to 7) to cancel/suspend skipping of PDCCH monitoring is met, UE may not apply skipping cancellation/suspension, if skipping duration does not extend until the end of active time during the DRX operation.

In methods 1 to 7 described in this disclosure, in an embodiment, if criteria (as defined in methods 1 to 7) to cancel/suspend skipping of PDCCH monitoring is met, UE may apply skipping cancellation/suspension only for a part/portion of skipping duration wherein the length of part/portion may be pre-defined or signaled by gNB in RRC/DCI/MAC CE, the unit in which length is specified may be in slots/symbols/subframes/frames/number of PDCCH monitoring occasions.

In methods 1 to 7 described in this disclosure, in an embodiment, if criteria (as defined in methods 1 to 7) to cancel/suspend skipping of PDCCH monitoring is met, UE may apply skipping cancellation/suspension only for first/earliest PDCCH monitoring occasion in the skipping duration.

In methods 1 to 7 described in this disclosure, in an embodiment, if criteria (as defined in methods 1 to 7) to cancel/suspend skipping of PDCCH monitoring is met, UE may apply skipping cancellation/suspension for earliest 'N' PDCCH monitoring occasion in the skipping duration, where parameter 'N' may be pre-defined or signaled by gNB in RRC message or system information.

Features of the above described embodiments, methods and aspects can be combined unless their combining results in evident technical conflicts. In addition, each of the above described embodiments, methods and aspects may be performed independently, or two or more embodiments, methods or aspects may be combined and performed.

Figure 12:
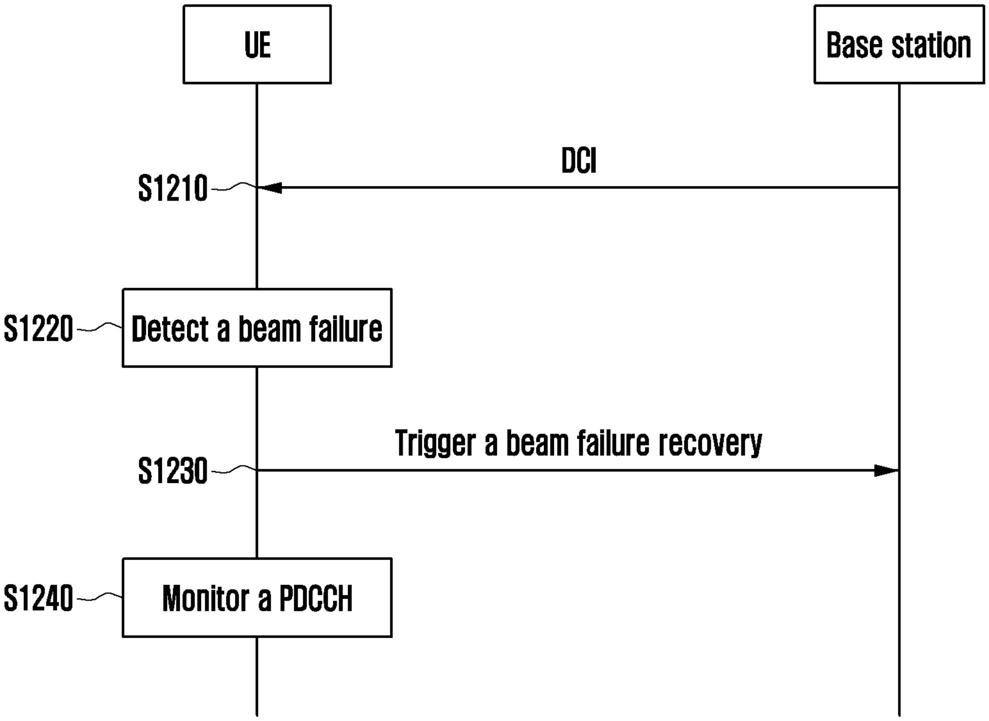
FIG. 12 illustrates an example of a signaling flow between a UE and a base station according to an embodiment of the disclosure.

FIG. 12 illustrates an example of a signaling flow between a UE and a base station according to an embodiment of the disclosure. The above-described methods (e.g., method 1/2/3/4/5/6/7) and embodiments in the disclosure may be performed based on the signaling flow of FIG. 12.

The UE may receive downlink control information (DCI) from the base station (S1210). That is, the base station may transmit the DCI. The DCI may include information indicating skipping physical downlink control channel (PDCCH) monitoring for a first duration (e.g., PDCCH skipping duration).

The UE may detect a beam failure (S1220). The beam failure is detected on a serving cell if number of consecutive detected beam failure instance exceeds a configured maximum number (beamFailureInstanceMaxCount) within a configured time (beamFailureDetectionTimer).

The UE may trigger a beam failure recovery (S1230). The base station may identify that the beam failure recovery is triggered. For example, if the serving cell on which the beam failure is detected is SCell, the beam failure recovery is triggered for the serving cell. If the serving cell on which the beam failure is detected is not SCell, the UE may initiate a random access procedure on a SpCell.

The UE may monitor a PDCCH associated with the beam failure recovery (S1240) during a second duration within the first duration. The base station may transmit the PDCCH associated with the beam failure recovery to the UE during the second duration within the first duration. For example, the PDCCH associated with the beam failure recovery is addressed to C-RNTI indicating uplink grant for a new transmission and is received for the HARQ process used for the transmission of the BFR MAC CE or Truncated BFR MAC CE which contains beam failure recovery information.

In an embodiment, in case that the second duration is same as the first duration, the UE may monitor the PDCCH associated with the beam failure recovery. In other words, the PDCCH monitoring is not skipped for the first duration.

In an embodiment, in case that the PDCCH associated with the beam failure recovery is received before end of the first duration, the PDCCH monitoring is skipped from after the PDCCH is received within the first duration. In other words, the base station may not transmit the PDCCH associated with the beam failure recovery from after the PDCCH is received by the UE (i.e., procedure of the beam failure recovery is successfully completed) within the first duration.

In an embodiment, the UE may monitor the PDCCH on all serving cells of a cell group during the second duration. If a secondary discontinuous reception (DRX) group and a non-secondary DRX group are configured, the cell group is one of the secondary DRX group or the non-secondary DRX group. In this case, the base station may prior transmit information configuring the secondary DRX group and the non-secondary DRX group to the UE.

In an embodiment, the UE may monitor the PDCCH on a specific cell among a plurality of serving cells of a cell group during the second duration. The specific cell may be a cell on which a medium access control-control element (MAC-CE) for triggering the beam failure recovery is transmitted or a cell for which the beam failure is not detected.

The UE may receive the PDCCH associated with the beam failure recovery, and the procedure of the beam failure recovery may be completed successfully.

Figure 13:
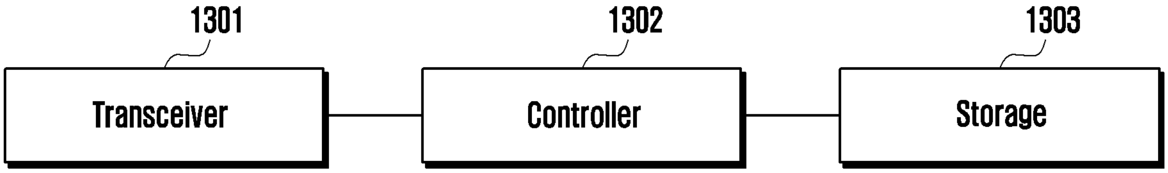
FIG. 13 is a diagram illustrating the structure of a UE according to an embodiment of the disclosure.

FIG. 13 is a diagram illustrating the structure of a UE according to an embodiment of the disclosure.

Referring to FIG. 13, the UE may include a transceiver 1301, a controller 1302, and a storage 1303. However, the components of the UE are not limited to the above-described examples. For example, the UE may include more or fewer components than the aforementioned components. Further, the transceiver 1301, the controller 1302, and the storage 1303 may be implemented in the form of a single chip. For example, the controller 1302 may be defined as a circuit or application-specific integrated circuit or at least one processor.

The transceiver 1301 may transmit and receive signals to and from another network entity. For example, the transceiver 1301 may receive RRC signaling being broadcasted from a base station according to an embodiment of the disclosure. For example, the transceiver 1301 may receive downlink control information (DCI) including information that indicates skipping physical downlink control channel (PDCCH) monitoring for a first duration.

The controller 1302 may be configured to control operations of the UE according to embodiments and/or methods (e.g., methods 1/2/3/4/5/6/7) of the disclosure. For example, the controller 1302 may control signal flow between respective blocks so as to perform an operation according to the above-described drawings and flowcharts. Specifically, the controller 1302 may configured to detect a beam failure and trigger a beam failure recovery. The controller 1302 may configured to monitor a PDCCH associated with the beam failure recovery during a second duration within the first duration.

The storage 1303 may store at least one of information being transmitted and received through the transceiver 1301 and information being generated through the controller 1302. In an embodiment, the storage comprises one or more memories.

Figure 14:
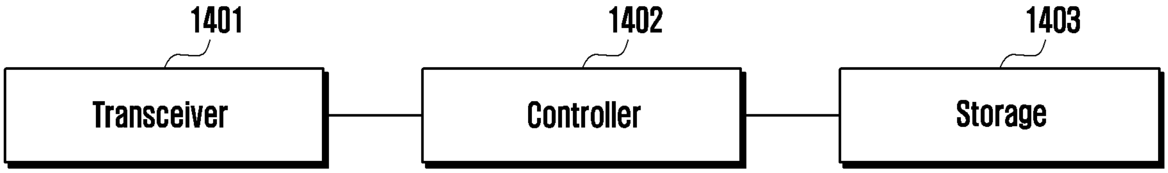
FIG. 14 is a diagram illustrating the structure of a base station according to an embodiment of the disclosure.

FIG. 14 is a diagram illustrating the structure of a base station according to an embodiment of the disclosure.

Referring to FIG. 14, the base station may include a transceiver 1401, a controller 1402, and a storage 1403. However, the components of the base station are not limited to the above-described examples. For example, the base station may include more or fewer components than the aforementioned components. Further, the transceiver 1401, the controller 1402, and the storage 1403 may be implemented in the form of a single chip. For example, the controller 1402 may be defined as a circuit or application-specific integrated circuit or at least one processor.

The transceiver 1401 may transmit and receive signals to and from another network entity. For example, the transceiver 1401 may transmit downlink control information (DCI) including information that indicates skipping physical downlink control channel (PDCCH) monitoring for a first duration.

The controller 1402 may be configured to control operations of the base station according to embodiments and/or methods (e.g., methods 1/2/3/4/5/6/7) of the disclosure. For example, the controller 1402 may control signal flow between respective blocks so as to perform an operation according to the above-described drawings and flowcharts. Specifically, the controller 1402 may be configured to identify that a beam failure recovery is triggered, and control the transceiver 1401 to transmit a PDCCH associated with the beam failure recovery during a second duration within the first duration.

The storage 1403 may store at least one of information being transmitted and received through the transceiver 1401 and information being generated through the controller 1402. In an embodiment, the storage comprises one or more memories.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by a user equipment (UE) in a wireless communication system, the method comprising:

receiving downlink control information (DCI) including information that indicates skipping physical downlink control channel (PDCCH) monitoring for a cell group in a first duration;

detecting a beam failure for a first cell of the cell group;

transmitting a beam failure recovery (BFR) medium access control-control element (MAC-CE) for triggering a BFR for the first cell of the cell group; and monitoring, on a second cell of the cell group, a PDCCH associated with the BFR during a second duration within the first duration, wherein the second cell is a cell on which the BFR MAC-CE for triggering the BFR is transmitted.

2. The method of claim 1, wherein the second duration is identical to the first duration, and wherein the PDCCH monitoring is not skipped on the second cell for the first duration.

3. The method of claim 1, further comprising:

in case that the PDCCH associated with the BFR is received before an end of the first duration, skipping, on the second cell of the cell group, the PDCCH monitoring from after the PDCCH is received until the end of the first duration.

4. The method of claim 1, further comprising:

monitoring the PDCCH on all serving cells of the cell group during the second duration.

5. The method of claim 1, further comprising:

identifying that at least one discontinuous reception (DRX) group is configured in the cell group; and monitoring the PDCCH in cells of a DRX group to which the second cell belongs among the at least one DRX group.

6. The method of claim 1, wherein the second duration is a time interval from a start of the first duration until the BFR is canceled within the first duration.

7. A method performed by a base station in a wireless communication system, the method comprising:

transmitting, to a user equipment (UE), downlink control information (DCI) including information that indicates skipping physical downlink control channel (PDCCH) monitoring for a cell group in a first duration;

receiving, from the UE, a beam failure recovery (BFR) medium access control-control element (MAC-CE) for triggering a BFR for a first cell of the cell group; and transmitting, to the UE, a PDCCH associated with the BFR on a second cell of the cell group during a second duration within the first duration, wherein the second cell is a cell on which the BFR MAC-CE for triggering the BFR is received.

8. The method of claim 7, wherein in case that the second duration is identical to the first duration, the PDCCH monitoring is not skipped on the second cell for the first duration, and wherein in case that the PDCCH associated with the BFR is transmitted before an end of the first duration, the PDCCH monitoring on the second cell of the cell group is skipped from after the PDCCH is received by the UE until the end of the first duration.

9. The method of claim 7, further comprising:

transmitting, to the UE, information configuring at least one discontinuous reception (DRX) group; and transmitting, to the UE, the PDCCH in cells of a DRX group to which the second cell belongs among the at least one DRX group.

10. A user equipment (UE) in a wireless communication system, the UE comprising:

a transceiver configured to:

receive downlink control information (DCI) including information that indicates skipping physical downlink control channel (PDCCH) monitoring for a cell group in a first duration; and a controller coupled with the transceiver and configured to:

detect a beam failure for a first cell of the cell group, transmit a beam failure recovery (BFR) medium access control-control element (MAC-CE) for triggering BFR for the first cell of the cell group, and monitor, on a second cell of the cell group, a PDCCH associated with the BFR during a second duration within the first duration, wherein the second cell is a cell on which the BFR MAC-CE for triggering the BFR is transmitted.

11. The UE of claim 10, wherein in case that the PDCCH associated with the BFR is received before an end of the first duration, the controller is further configured to skip, on the second cell of the cell group, the PDCCH monitoring from after the PDCCH is received until the end of the first duration.

12. The UE of claim 10, wherein the controller is further configured to:

identify that at least one discontinuous reception (DRX) group is configured in the cell group, and monitor the PDCCH in cells of a DRX group to which the second cell belongs among the at least one DRX group.

13. A base station in a wireless communication system, the base station comprising:

a transceiver; and a controller coupled with the transceiver and configured to:

transmit, to a user equipment (UE), downlink control information (DCI) including information that indicates skipping physical downlink control channel (PDCCH) monitoring for a cell group in a first duration, receive, from the UE, a beam failure recovery (BFR) medium access control-control element (MAC-CE) for triggering a BFR for a first cell of the cell group, and transmit, to the UE, a PDCCH associated with the BFR on a second cell of the cell group during a second duration within the first duration, wherein the second cell is a cell on which the BFR MAC-CE for triggering the BFR is received.

* * * * *